(12) United States Patent
Esfahani (10) Patent No.: US 10,624,185 B2
(45) Date of Patent: Apr. 14, 2020

(54) LIGHTING SYSTEM AND METHOD FOR AUTOMATIC CONTROL OF AN ILLUMINATION PATTERN

(71) Applicant: PLEJD AB, Göteborg (SE)

(72) Inventor: Babak Esfahani, Göteborg (SE)

(73) Assignee: PLEJD AB, Göteborg (SE)

( * ) Notice: Subject to any disclaimer, the term of this patent is extended or adjusted under 35 U.S.C. 154(b) by 0 days.

(21) Appl. No.: 16/339,082

(22) PCT Filed: Oct. 16, 2017

(86) PCT No.: PCT/SE2017/051017
§ 371 (c)(1),
(2) Date: Apr. 3, 2019

(87) PCT Pub. No.: WO2018/074970
PCT Pub. Date: Apr. 26, 2018

(65) Prior Publication Data
US 2019/0239325 A1 Aug. 1, 2019

(30) Foreign Application Priority Data

Oct. 18, 2016 (SE) ...................................... 1651358
Jan. 12, 2017 (SE) ...................................... 1750019
May 8, 2017 (SE) ...................................... 1750554

(51) Int. Cl.
*H05B 37/02* (2006.01)
*H05B 33/08* (2020.01)
*G01S 19/14* (2010.01)
*H04L 12/28* (2006.01)

(52) U.S. Cl.
CPC .......... *H05B 37/0281* (2013.01); *G01S 19/14* (2013.01); *H04L 12/2816* (2013.01); *H05B 33/0863* (2013.01); *H05B 37/0218* (2013.01); *H05B 37/0227* (2013.01); *H05B 37/0272* (2013.01); *Y02B 20/42* (2013.01)

(58) Field of Classification Search
CPC ........................ H05B 37/0272; H05B 37/0218
USPC .................................. 315/149, 292, 291, 308
See application file for complete search history.

(56) References Cited

U.S. PATENT DOCUMENTS

| | | | |
|---|---|---|---|
| 7,911,158 B2 | 3/2011 | Verbrugh et al. | |
| 9,332,616 B1 | 5/2016 | Modi et al. | |
| 2007/0273307 A1 | 11/2007 | Westrick et al. | |
| 2011/0307112 A1 | 12/2011 | Barrilleaux | |

(Continued)

FOREIGN PATENT DOCUMENTS

WO 2013102881 A1 7/2013

OTHER PUBLICATIONS

PCT International Search Report and Written Opinion dated Nov. 30, 2017 for International Application No. PCT/SE2017/051017, 11 pages.

(Continued)

*Primary Examiner* — Thuy V Tran
(74) *Attorney, Agent, or Firm* — RMCK Law Group, PLC (57) ABSTRACT

The present invention generally relates to a lighting system for illuminating an area, specifically where the lighting system is adapted for automatic control of an illumination pattern based on previous user behavior and dependent on a current sunrise and sunset time at a physical location of the illumination system. The invention also relates to a corresponding method and a computer program product.

18 Claims, 3 Drawing Sheets

(56) References Cited

U.S. PATENT DOCUMENTS

| | | |
|---|---|---|
| 2012/0169249 A1 | 7/2012 | Loveland et al. |
| 2014/0028198 A1 | 1/2014 | Reed et al. |
| 2015/0296594 A1 | 10/2015 | Blum et al. |
| 2015/0312995 A1 | 10/2015 | Bora et al. |
| 2016/0234899 A1* | 8/2016 | Reed .................. H05B 33/0827 |
| 2016/0286630 A1 | 9/2016 | Witzgall |
| 2016/0295658 A1 | 10/2016 | Chraibi et al. |
| 2017/0064795 A1* | 3/2017 | Stockburger ....... H05B 37/0227 |
| 2018/0168016 A1* | 6/2018 | Rajagopalan ........ H05B 37/029 |

OTHER PUBLICATIONS

Extended European Search Report dated Feb. 26, 2020 for EP Application No. 17862040.7, 8 pages.

* cited by examiner

LIGHTING SYSTEM AND METHOD FOR AUTOMATIC CONTROL OF AN ILLUMINATION PATTERN

CROSS-REFERENCE TO RELATED APPLICATIONS

This application is a 371 U.S. National Stage of International Application No. PCT/SE2017/051017, filed Oct. 16, 2017, which claims priority to Swedish Patent Application No. 1651358-2, filed Oct. 18, 2016, Swedish Patent Application No. 1750019-0, filed Jan. 12, 2017 and Swedish Patent Application No. 1750554-6, filed May 8, 2017. The disclosures of each of the above applications are incorporated herein by reference in their entirety.

TECHNICAL FIELD

The present invention generally relates to a lighting system for illuminating an area, specifically where the lighting system is adapted for automatic control of an illumination pattern based on previous user behavior and dependent on current day of the year and a physical location of illumination system. The invention also relates to a corresponding method and a computer program product.

BACKGROUND OF THE INVENTION

In using a conventional lighting system, for example in a residential home, each luminaire, such as for example arranged in a ceiling of a room, is controlled using an individually provided light control unit, such as a push-on/push-off switch button. Recently, there has been a desire to improve the overall control of lighting and possibly further electrical equipment, forming the so-called "intelligent home", where intelligent lighting systems combine light emitting diodes (LEDs), embedded sensors and controls, and low-cost pervasive networking to create an integrated illumination system that is highly responsive to its environment. Benefits of some or all such intelligent systems may include, but are not limited to, a much higher quality of light tailored specifically to user needs and significant energy savings, compared to legacy lighting system technologies.

An example of such an intelligent lighting system is disclosed in U.S. Pat. No. 7,911,158, providing a lighting system that introduces a minor change to a given set of parameters that affect a lighting ambiance associated with an environment, and collects the user's response to the change. Based on the user's response, the system learns which changes to which parameters lead to an improved effect. By repeating the change-feedback sessions, the system approaches an optimal setting for achieving the desired ambiance in the given environment. The change-feedback session occurs for example each time a light is turned on, and the feedback is collected when the light is turned off, using a specifically formed multiple switch arrangement. If the light is turned off using one switch, the feedback is positive; if the light is turned off using an alternative switch, the feedback is negative.

Even though U.S. Pat. No. 7,911,158 provides an interesting approach to lighting control, the use will have to actively react to an automatic change introduced by the lighting system, over time being somewhat intrusive to the users, since the user will have to react to adjustments proposed by the system. Thus, it would be desirable to introduce a novel methodology, being less intrusive as compared to prior art and more adaptable to the actual behavior of the user.

SUMMARY OF THE INVENTION

According to an aspect of the invention, the above is at least partly met by a lighting system for illuminating an area, comprising a controllable luminaire, a control unit connected and adapted to control the controllable luminaire to illuminate the area according to an illumination pattern, a manually operate control interface connected to the control unit, the control interface adapted to generate a control signal indicative of a user desire to adjust the illumination pattern provided by the controllable luminaire, wherein the control unit is configured to determine a user desired illuminating pattern based a plurality of consecutively received control signals for adjusting the illumination pattern, adjust the user desired illumination pattern based on an adjustment signal from a clock module comprised with the control unit, the adjustment signal being based on current day of the year and a physical location of the control unit, and automatically control the controllable luminaire according to the adjusted user desired illumination pattern independent on reception of further control signals from the user operated control interface.

By means of the present disclosure, there is provided a self-learning lighting system. In comparison to the above-mentioned prior-art implementation, the disclosed lighting system over time "mimics" the user behavior with the intention to automate the lighting behavior previously performed by the user. However, to be able to accurately generate a user behavior as seen over time, the disclosed lighting system further takes into account an adjustment signal from a clock module, where the adjustment signal is based on both of a physical location of where the lighting control takes places as well as a current day of the year.

The user will in a start-up phase of using the lighting system control the controllable luminaire, using a manually operated user interface, such as a rotary dimmer knob, a button, etc., where after the lighting system gradually will take over control to automate how the user environment is illuminated. Since the disclosed lighting system also will take into account both of the current day of the year and the physical location, the lighting pattern provided will in a much more realistic way mimic how the user in fact would want his environment to be illuminated. That is, due to having knowledge of where the lighting system is located, it may for example be possible to determine a sunrise and sunset time at the physical location of the control unit, meaning that the provided illumination pattern may be adjusted to account for the solar altitude, possibly adapting the illumination pattern based on an expected amount of incident/ambient (sun) light. By also making use of the current day of the year, a slightly shifting user behavior may be made use of, for example, where the user spends less time at home during the summer period as compared to the winter period, when automating the illumination of the user environment.

The control module may in one embodiment comprise an astronomic clock. The lighting system may in one embodiment further comprise GPS circuitry connected to the control unit and adapted to determine the physical location of the control unit. The physical location may alternatively be e.g. manually "programmed" with the control unit. The physical location either determined automatically using the GPS circuitry or manually, is typically used as an input to the astronomic clock for determining sunrise and sunset times.

The lighting system may in one embodiment further comprise a light sensor for measuring incident light to be provided as information to the control unit. Such an implementation may in some situations, for example where the user environment lacks windows, be used for compensating for the expected amount of ambient light as mentioned above. Alternatively, information relating to a measured incident light may also be used for compensating a case where the user environment receives a high amount of direct sun light.

The user environment may in one embodiment be a defined indoor area, such as the user's home or office. However, the user environment may also partly comprise an outdoor area, such as a patio, as will be further elaborated below.

In a preferred embodiment of the present disclosure, the lighting system comprises a plurality of individually controllable luminaires, in combination adapted to illuminate the user's environment with the user desired illumination pattern. The plurality of individually controllable luminaires may be electrically connected to the control unit using electrical wiring, or wirelessly connected to the control unit. A combination thereof is of course possible.

Preferably, the control unit comprises a wireless transceiver for communicating an illumination command to the plurality of individually controllable luminaires. The transceiver may for example be one of a Bluetooth or Wi-Fi transceiver, adapted for wireless communication with the plurality of individually controllable luminaires.

In a preferred embodiment of the present disclosure, the lighting system further comprising an occupancy sensor connected to the control unit, wherein the adjusted user desired illumination pattern is further based on an occupancy signal generated by the occupancy sensor. Using the occupancy sensor, it is possible to learn how the user is occupying his e.g. home, when he his home, etc., to learn a user occupancy behavior for the user environment (e.g. the home/office space). The information may for example used in correlation with the current day of the year, in a manner as indicated above and e.g. relating to how much time the user spends at home over the year. In addition, information from the occupancy sensor may over time also be used for automatically activating the luminaire(s), such as when the user arrives at home.

In addition to the discussion above, it should be understood that the expression "illumination pattern" should be interpreted broadly, i.e. not just relating to a brightness level. In accordance to the present disclosure, it may also be possible to adjust light parameters for the luminaire(s) in relation to e.g. color saturation, distribution/direction of light, distribution of color of light illuminated by the luminaire(s), etc.

In a possible embodiment of the present disclosure the control unit is further configured to determine a time period between consecutively received control signals, and activate a non-activity mode if the time period is above a predetermined threshold. As an alternative, or also, the lighting system may further comprise at least one sensor for detecting activity (such as for example the above mentioned occupancy sensor) of a person within the area, wherein the control unit is further configured to activate a non-activity mode if no activity has been detected for a time period exceeding a predetermined threshold.

That is, in case the lighting system detects that no user activity is present within the area, for a predetermined period such as e.g. at least 24 hours, it may be possible to make use of this information for further control of the system. Preferably, this information could be used for automatically controlling the lighting system for mimicking a user activity within the area. For example, the non-activity mode may in some implementations correspond to an indication that the "household" (normal users occupying the area) have left for a holiday. The lighting system will thus, based on the previously "learned user behavior" automatically control the lighting system such that the illumination patterns provided by the lighting system essentially corresponds to a when the user is normally present within the area.

Preferably, in case the lighting system again detects the user within the area (e.g. occupancy sensor or light switching activity), the lighting system enters into a corresponding activity mode, where the lighting system functions as discussed above.

According to another aspect of the present invention there is provided a computer-implemented method for operating a lighting system adapted for illuminating an area, the lighting system comprising a controllable luminaire, a control unit connected and adapted to control the controllable luminaire to illuminate the area according to an illumination pattern, a manually operate control interface connected to the control unit, the control interface adapted to generate a control signal indicative of a user desire to adjust the illumination pattern provided by the controllable luminaire, wherein the method comprises the steps of determining, using the control unit, a user desired illuminating pattern based a plurality of consecutively received control signals for adjusting the illumination pattern, adjusting, using the control unit, the user desired illumination pattern based on an adjustment signal from a clock module comprised with the control unit, the adjustment signal being based on current day of the year and a physical location of the control unit, and automatically controlling, using the control unit, the controllable luminaire according to the adjusted user desired illumination pattern independent on reception of further control signals from the user operated control interface. This aspect of the invention provides similar advantages as discussed above in relation to the previous aspect of the invention.

According to a still further aspect of the present invention there is provided a computer program product comprising a non-transitory computer readable medium having stored thereon computer program means for operating a lighting system adapted for illuminating an area, the lighting system comprising a controllable luminaire, a control unit connected and adapted to control the controllable luminaire to illuminate the area according to an illumination pattern, a manually operate control interface connected to the control unit, the control interface adapted to generate a control signal indicative of a user desire to adjust the illumination pattern provided by the controllable luminaire, wherein the computer program product comprises code for determining, using the control unit, a user desired illuminating pattern based a plurality of consecutively received control signals for adjusting the illumination pattern, code for adjusting, using the control unit, the user desired illumination pattern based on an adjustment signal from a clock module comprised with the control unit, the adjustment signal being based on current day of the year and a physical location of the control unit, and code for automatically controlling, using the control unit, the controllable luminaires according to the adjusted user desired illumination pattern independent on reception of further control signals from the user operated control interface. In addition, this aspect of the invention provides similar advantages as discussed above in relation to the previous aspects of the invention.

A software executed by the server for operation in accordance to the invention may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Figure 1:
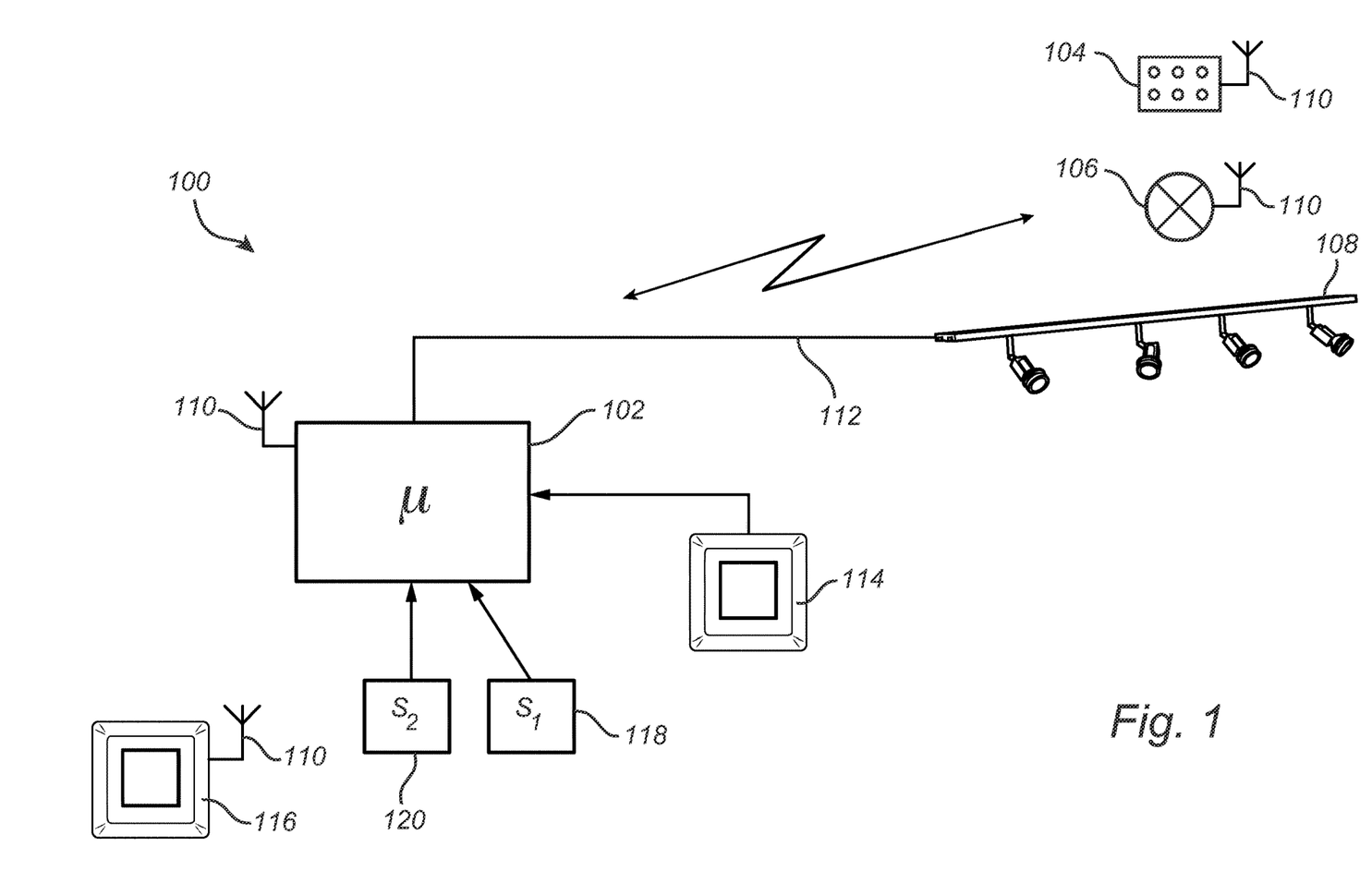
FIG. 1 illustrates a lighting system according to a currently preferred embodiment of the present disclosure.

Referring now to the drawings and to FIG. 1 in particular, there is depicted a lighting system 100 according to a possible embodiment of the present disclosure. The lighting system 100 comprises a control unit 102 and a plurality of luminaires 104, 106, 108. The control unit 102 is equipped with a wireless transceiver 110 configured to wirelessly transmit control commands to the luminaires 104 and 106, where each of the luminaires 104 and 106 are provided with a corresponding transceiver 110 adapted for receiving the lighting commands from the control unit 102. The luminaire 108 is on the other hand electrically wired to the control unit 102 (where the control unit for example may be equipped with driver circuitry) using electrical wiring 112. The lighting system 100 may of course comprise further or less luminaires. In addition, the functionality provided by the control unit 102 may in some embodiments of the present disclosure be distributed between the luminaires (e.g.) 104, 106.

The luminaires 104, 106, 108 are preferably individually controllable, but may also be arranged in different groups, where the lighting pattern provided by each luminaire within the same group is adapted to be similar (possibly dependent on lighting technology). In a possible embodiment, the luminaires within the same group may also be allowed to be controlled in dependence of each other. For example, a first of the luminaires in the group of luminaires may be activated first, and in case "more light" is needed at some instance, a luminaire in the group of luminaires may be activated. Thus, there may be a dependency between the individually controllable luminaires 104, 106, 108.

The lighting system 100 further comprises a manually operate control interface, such as a rotary knob or a first button 114, being connected to the control unit 102. The first button 114 is used by the user for controlling the luminaires 104, 106, 108. The first button 114 is arranged in electrical communication with the control unit 102; however, the lighting system 100 may also be provided with a second button 116, the second button 116 provided with a transceiver 110 and arranged for wireless communication with the control unit 102. The second button 116 may for example be arranged remotely from the control unit 102. The first button 114 may for example be arranged in one location/section of the user's home environment and the second button 116 in another, different, location/section of the user's home environment.

Furthermore, the lighting system 100 may be provided with a first 118 and a second 120 sensor arranged in (electrical or wireless) communication with the control unit 102, and adapted for acquiring environmental data relating to e.g. the users home environment. In the illustrated embodiment, the first sensor 118 is an occupancy sensor adapted to acquire information relating to the presence of a person within the user's home environment. The second sensor 112 is exemplified as a lighting sensor adapted to measure incident light, e.g. sunlight entering though a window.

In addition, the luminaires 104, 106, 108 may include a mixture of e.g. halogen based or light emitting diode (LED) based luminaires. A halogen based luminaire may for example be configured to receive an unregulated electrical mains AC signal, e.g. rated at 230 or 110 V, whereas an LED based luminaire may need a regulated DC drive signal at e.g. 5V, 12 V, 18 V, etc.

Further to the above, control unit 102 may include a microprocessor, microcontroller, programmable digital signal processor or another programmable device. The control unit 102 may also, or instead, each include an application specific integrated circuit, a programmable gate array or programmable array logic, a programmable logic device, or a digital signal processor. Where the control unit 102 includes a programmable device such as the microprocessor, microcontroller or programmable digital signal processor mentioned above, the processor may further include computer executable code that controls operation of the programmable device. The wireless transceiver 110 is preferably configured for Bluetooth communication. However, other wireless implementations are possible, such as using WLAN, CDMA, GSM, GPRS, 3G mobile communications, 4G mobile communications, Zig-Bee, infrared, or similar. The wireless communication is preferably performed within a radio spectrum comprising frequency bands within the 2.4 GHz range, possibly also or instead at the 5 GHz radio frequency spectrum.

Figure 2:
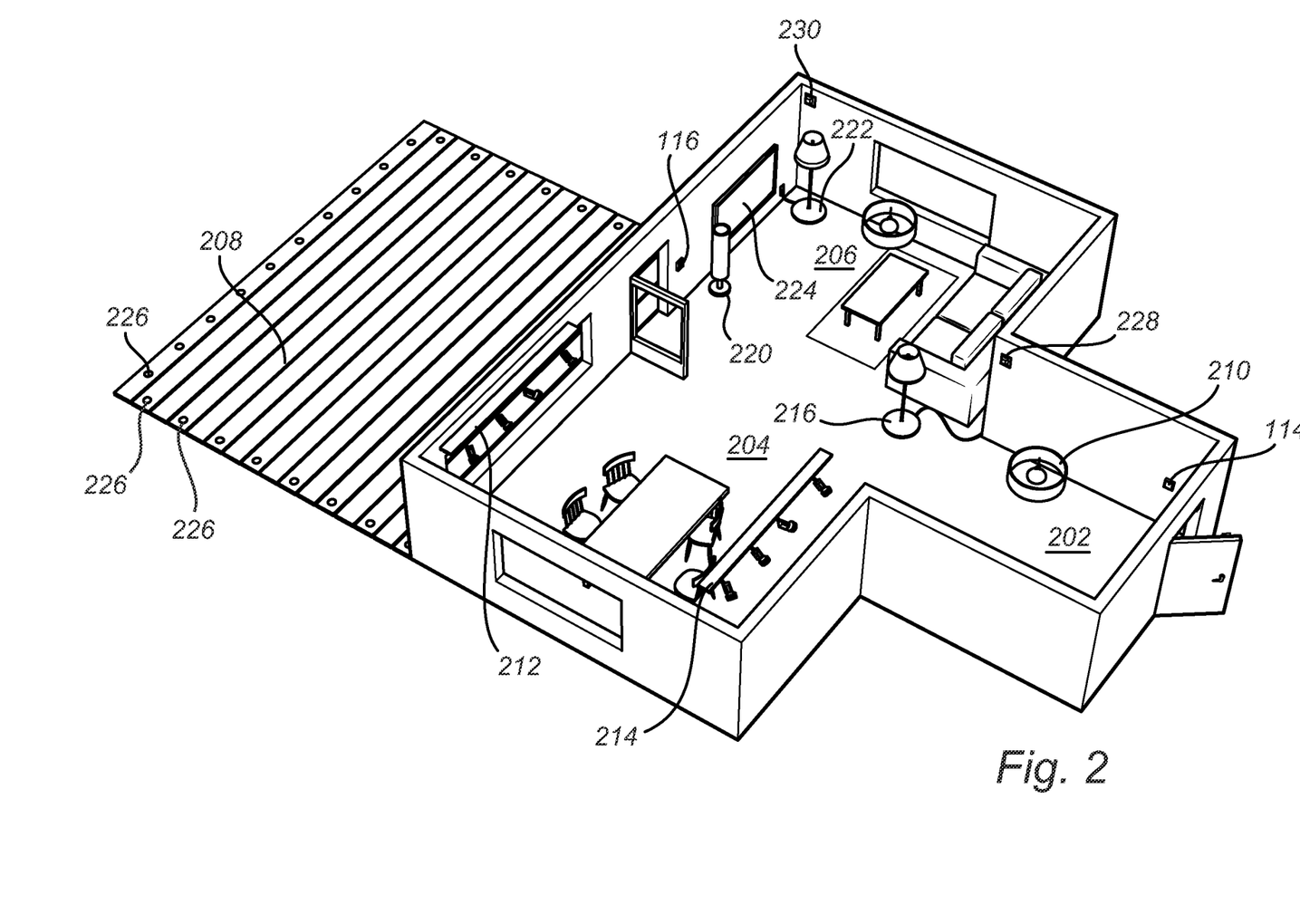
FIG. 2 shows a conceptual installation of the lighting system illuminating a defined area.

Turning now to FIG. 2, providing a conceptual installation and use of a corresponding lighting system 200 adapted for illuminating a defined area, such as the user's home environment. In FIG. 2, a plan view is shown of a user's home environment, including a hallway section 202, a dining section 204, an entertainment and TV section 206 and an outdoor patio section 208. In each of the sections 202, 204, 206, 208 of the user's home environment, there are arranged individually controlled luminaries. The hallway section is provided with a roof-mounted luminaire 210. The dining section 204 is provided with a first 212 and a second 214 set of rail mounted lights. The entertainment and TV section 206 is provided with a reading light 216, a rood mounted luminaire 218, as well as a first 220 and a second 222 luminaire provided adjacently on each side of a TV set 224. In addition, the patio section 208 is provided with deck lights 226.

Furthermore, the lighting system 200 is provided with a first and a second control interface members to be manually operated by the user, such as the first 114 and the second 116 buttons and a first 228 and a second 230 occupancy sensor.

Figure 3:
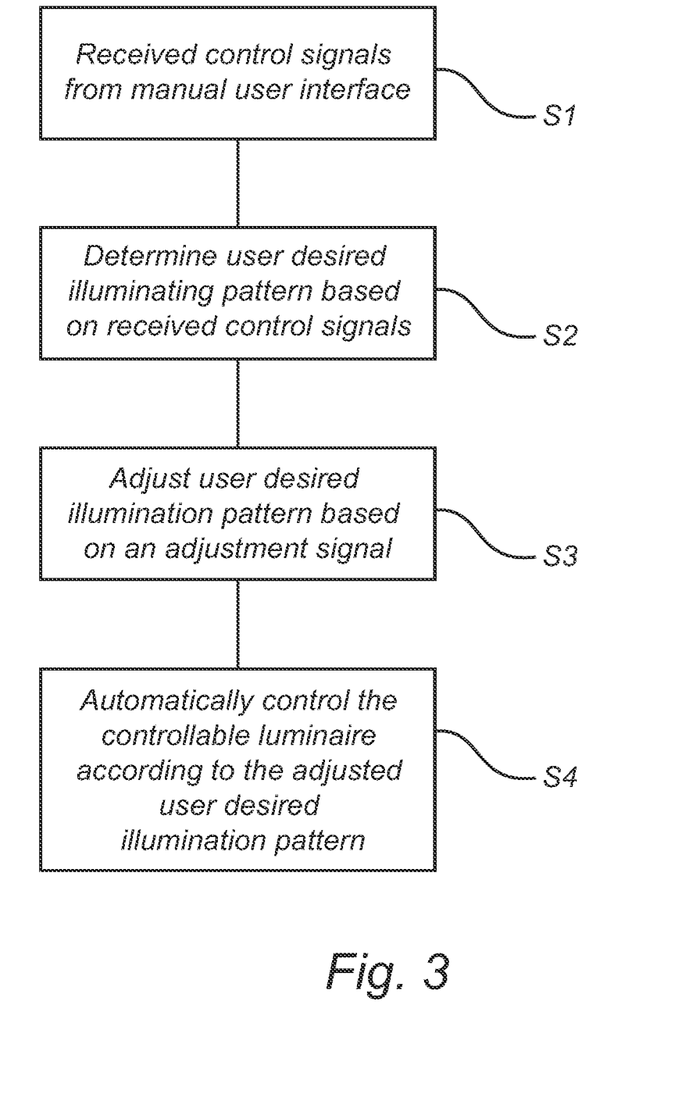
FIG. 3 shows a flow chart of a method according to an embodiment of the present disclosure.

During operation of the lighting system 100/200, with further reference to FIG. 3, a user has installed the lighting system 200 within his/her home environment. The user uses the buttons 114, 116 to control the luminaires 202, 212, 214, 216, 218, 220, 222 and 226, for example in relation to color saturation, brightness, distribution of light, etc., where the buttons 114, 116 generate control signals to be received, S1, by the control unit 102. The control signals corresponds to an indication of a user desire in regards to how the individually controllable luminaires are to illuminate the user's home environment. In an initial phase of using the lighting system 100/200, the control signals will directly control the luminaires 202, 212, 214, 216, 218, 220, 222.

Over time, the control unit 102 receives a (large) plurality of control signals from the buttons 114, 116. Once a suitable number of (above a predetermined threshold) control signals have been received, the control unit 102 starts to identify a user pattern and thereby determine (e.g. using machine learning), S2, a user desired illumination pattern. Once the user desired illumination pattern has been determined, the control unit 102 tries to adapt the user desired illumination pattern based on a current day of the year and a physical location of the control unit 102. As mentioned above, the control unit 102 may be equipped with an astronomic clock for calculating sunrise and sunset time at the physical location of the control unit 102, and possibly GPS circuitry for determining the physical location of the control unit. The adaptation of the illumination pattern may further take into account signals from the occupancy sensors 228, 230 and a signal from a light sensor for measuring incident light, e.g. entering through a window.

Eventually, once the user desired illumination pattern has been manipulated, it is possible for the control unit 102 to, without direct interaction from the user, adjust, S3, the illumination pattern provided within the users home environment and automatically, S4, control the emitted illumination pattern provided by the plurality of luminaires 201, 212, 214, 216, 218, 220, 222. The adjusted illumination patterns preferably mimic the user's typical behavior within his/her user environment. That is, the user may for example initially (manually) activate the deck lights 226 once the sun has set, but only during the weekends. Accordingly, the lighting system 100/200 learns this behavior from the user, eventually takes over control, and automatically activates the deck lights 226 once the sun has set, but only during the weekends.

Similarly, the lighting system 100/200 may, over time, learn that the user normally activates the luminaires 220, 222 when sitting down to watch TV, during weekdays and after approximately 8 pm, but not during summer. Accordingly, the occupancy sensor 230 may be used for determining that the user is sitting down in the entertainment and TV section 206, and base the automatic control of the luminaires 220, 222 on the day of the year, the time of the day, and also possibly dependent on the amount of light entering through a window within the entertainment and TV section 206 using the light sensor (not shown). Thus, not only does the illumination provided depend in the day of the year and the general behavior of the user, but also on how much external e.g. sun light is entering the user's environment.

Furthermore, in a possible implementation of the lighting system 100/200, it may be possible to allow the lighting pattern to be automatically adjusted between e.g. two "known" settings. For example, in case the lighting system 100/200 has identified that the user normally desires e.g. a light intensity level (dimming level) of:

100% at 4 pm,
80% at 6 pm,
70% at 7 pm, and
30% at 10 pm, then the lighting system 100/200 may automatically, slowly adjust the intensity levels between the discrete levels. Accordingly, the change in intensity level will not be distinctly perceived by the user, rather the intensity level will transition smoothly between the discrete (known) levels. The above example is of course applicable also to other forms of lighting patterns, such as changing between the color of light emitted by the luminaires, or transitioning between different active luminaire. The general idea is to achieve a smooth perception of the lighting pattern within the user space.

In accordance to the invention it may of course be possible for the user to deactivate or interrupt the "smooth transitioning process". In case the user interrupts the smooth transitioning process, it may again be automatically activated by the lighting system 100/200, for example after a predetermined time period.

In addition to the above, the illumination provided is dependent on the physical location of the illumination system 100/200. That is, a user located far north of e.g. the northern hemisphere will typically have a different way of applying indoor lighting as compared to a user located more south, e.g. closer to the equator. Accordingly, by means of the presented illumination system 100/200 this information may be taken into account when determining the user desired illuminating pattern as well as for adjusting the user desired illumination pattern.

In summary, the present invention relates to a modular assembly for controlling a thereto-connected first electrical equipment, the assembly adapted to be installed in an electrical junction box, wherein the assembly comprises a first base module comprising a housing, a control unit arranged within the housing, and a connection block adapted to electrically connect the electrical equipment with the control unit, and a first control module adapted to at least partly extending outside of the electrical junction box and further comprising a control member adapted to generate an electrical control signal, wherein each of the first base module and the first control module comprises a first interface to mechanically interconnect the first base module and the first control module, each of the first base module and the first control module comprises a second interface to electrically interconnect the first control module to the first base module, the first control module further comprises a frame portion to mechanically secure the assembly to the electrical junction box, the first base module comprises a wireless transceiver adapted for wireless communication with a corresponding second base module arranged remotely from the first base module, the control unit is adapted to control the first electrical equipment and a second electrical equipment connected to the second base module based on the electrical control signal, and the first base module is selected to generate a drive signal matching a driving preference for the electrical equipment.

By means of the present disclosure, a modular assembly is provided where a control module provided with a desired control member, such as a rotary knob and a switch, is combined with base module selected to match a driving preference for the electrical equipment. Accordingly, different type of electrical equipment, such as different types of light sources or luminaires applying different types of electrical control, may easily be operated in a desired manner, using the appropriate control member.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data, which cause a general-purpose computer, special purpose computer, or special purpose processing machines to perform a certain function or group of functions.

Although the figures may show a sequence the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A lighting system for illuminating an area, comprising:
a controllable luminaire;
a control unit connected and adapted to control the controllable luminaire to illuminate the area according to an illumination pattern;
a manually operated control interface connected to the control unit, the manually operated control interface adapted to generate a control signal indicative of a user desire to adjust the illumination pattern provided by the controllable luminaire,
wherein the control unit is configured to:
determine a user desired illuminating pattern based on a plurality of consecutively received control signals for adjusting the illumination pattern,
adjust the user desired illumination pattern based on an adjustment signal from a clock module comprised in the control unit, the adjustment signal being based on current day of the year and a physical location of the control unit,
automatically control the controllable luminaire according to the adjusted user desired illumination pattern independent on reception of further control signals from the manually operated control interface,
determine a time period between consecutively received control signals, and
activate a non-activity mode if the time period is above a predetermined threshold.

2. The lighting system according to claim 1, wherein the area is a defined indoor area.

3. The lighting system according to claim 1, wherein the controllable luminaire comprises a plurality of individually controllable luminaires.

4. The lighting system according to claim 3, wherein the adjusted user desired illumination pattern comprises setting for at least one of saturation, brightness, distribution of light, and distribution of color of light illuminated by the plurality of individually controllable luminaires.

5. The lighting system according to claim 3, wherein the control unit comprises a first wireless transceiver for communicating an illumination command to the plurality of individually controllable luminaires.

6. The lighting system according to claim 5, wherein the controllable luminaire comprises a second wireless transceiver adapted to receive the illumination command from the control unit.

7. The lighting system according to claim 5, wherein the first wireless transceiver is configured for Bluetooth communication.

8. The lighting system according to claim 1, wherein the adjustment signal is further based on a sunrise and sunset time at the physical location of the control unit.

9. The lighting system according to claim 1, wherein the clock module comprises an astronomic clock.

10. The lighting system according to claim 1, further comprising GPS circuitry connected to the control unit and adapted to determine the physical location of the control unit.

11. The lighting system according to claim 1, further comprising a light sensor for measuring incident light.

12. The lighting system according to claim 1, further comprising an occupancy sensor connected to the control unit, wherein the adjusted user desired illumination pattern is further based on an occupancy signal generated by the occupancy sensor.

13. The lighting system according to claim 1, further comprising at least one sensor for detecting activity of a person within the area, wherein the control unit is further configured to activate a non-activity mode if no activity has been detected for a time period exceeding a predetermined threshold.

14. The lighting system according to claim 13, wherein the predetermined threshold is at least 24 hours.

15. The lighting system according to claim 13, wherein when in the non-activity mode the lighting system is automatically controlled for mimicking a user activity within the area.

16. A computer-implemented method for operating a lighting system adapted for illuminating an area, the method comprising:
   determining, using a control unit included in the lighting system, a user desired illuminating pattern based on a plurality of consecutively received control signals for adjusting an illumination pattern,
   adjusting, using the control unit, the user desired illumination pattern based on an adjustment signal from a clock module comprised in the control unit, the adjustment signal being based on current day of the year and a physical location of the control unit,
   automatically controlling, using the control unit, a controllable luminaire included in the lighting system according to the adjusted user desired illumination pattern independent on reception of further control signals from a manually operated control interface connected to the control unit,
   determining a time period between consecutively received control signals, and
   activating a non-activity mode if the time period is above a predetermined threshold.

17. The method according to claim 16, wherein the controllable luminaire comprises a plurality of individually controllable luminaires.

18. A non-transitory computer readable medium having stored thereon executable instructions that, when executed by a computing system, cause the computing system to perform operations for operating a lighting system adapted for illuminating an area, the operations comprising:
   determining, using a control unit included in the lighting system, a user desired illuminating pattern based on a plurality of consecutively received control signals for adjusting an illumination pattern,
   adjusting, using the control unit, the user desired illumination pattern based on an adjustment signal from a clock module comprised with in the control unit, the adjustment signal being based on current day of the year and a physical location of the control unit,
   automatically controlling, using the control unit, a controllable luminaire included in the lighting system according to the adjusted user desired illumination pattern independent on reception of further control signals from a manually operated control interface connected to the control unit,
   determining a time period between consecutively received control signals, and
   activating a non-activity mode if the time period is above a predetermined threshold.

* * * * *